United States Patent

[11] 3,602,339

| [72] | Inventor | Georg Sontheimer<br>Ulm, Germany |
|---|---|---|
| [21] | Appl. No. | 820,779 |
| [22] | Filed | May 1, 1969 |
| [45] | Patented | Aug. 31, 1971 |
| [73] | Assignee | Firma Georg Fischer A.G.<br>Schaffhausen, Switzerland |
| [32] | Priority | May 3, 1968 |
| [33] | | Germany |
| [31] | | P 17 50 453.9 |

[54] DISC BRAKE, ESPECIALLY FOR MOTOR VEHICLES
7 Claims, 2 Drawing Figs.

[52] U.S. Cl. .................................................. 188/18 A,
188/71.1
[51] Int. Cl. ................................................... B60t 1/06
[50] Field of Search ........................................ 188/18 A,
71.1

[56] References Cited
UNITED STATES PATENTS
2,349,928  5/1944  Ash ............................. 188/18 A X
FOREIGN PATENTS
572,431  1/1958  Italy ............................. 188/18 A
438,968  12/1967  Switzerland .................. 188/18 A Primary Examiner—George E. A. Halvosa
Attorney—Werner W. Kleeman ABSTRACT: There is disclosed a disc brake system, especially for motor vehicles, in which a housing supporting the brake disc is connected with the wheel hub and the brake shoes are mounted to be axially displacable relative to the wheel axle. According to an important aspect of the invention, the brake disc is detachably secured to the marginal edge or portion of the housing, which preferably possesses a substantially bell-shaped configuration, and the support for the brake shoes surrounds the wheel axle in the form of a sliding sleeve.

PATENTED AUG 31 1971 3,602,339

INVENTOR.
GEORG SONTHEIMER
BY
Jaeshi, Davidson & Kleeman,
ATTORNEYS

> # 3,602,339

DISC BRAKE, ESPECIALLY FOR MOTOR VEHICLES

BACKGROUND OF THE INVENTION

The present invention relates to an improved disc brake system, especially for motor vehicles, of the type wherein the brake disc is fixedly mounted and the brake shoes are mounted to be axially displaceable.

With conventional disc brake systems of this type, the construction of the brake disc considerably affects the design or physical construction of the axles, because the braking forces and the actuation means for the inner brake jaw must be disposed about the outer marginal edge of the brake disc.

SUMMARY OF THE INVENTION

Accordingly, it is a primary object of the present invention to provide an improved disc brake system which improves upon the prior art constructions, and which is not only relatively simple in structure, but extremely reliable in operation for increased periods of use.

Another more specific object of this invention contemplates the provision of an improved disc brake system with which motor vehicles or trailer axles can be subsequently equipped, the brake system being extremely reliable and safe, and providing increased longevity of the brake system.

Still another noteworthy object of the present invention is directed to the provision of an improved disc brake system which can be reliably installed at a vehicle after manufacture of the latter, while affording a brake system for such vehicle which is extremely safe and reliable in operation, requires a minimum of maintenance and service, and wherein the arrangement of the components is such that replacement of parts of the brake system can be carried out easily, quickly and with minimum effort.

Now, in order to implement these and still further objects of the invention which will become more readily apparent as the description proceeds, the disc brake system of the present invention, especially adapted for use with motor vehicles, contemplates that a housing carrying the brake disc is coupled with the wheel hub, and the brake shoes are mounted to be axially displaceable with respect to the wheel axle. According to one important facet of the invention, the brake disc is detachably secured to the marginal edge of the housing, which is preferably of substantially bell-shaped configuration, and the brake shoe supports surround the wheel axle in the form of a clutch or sliding sleeve.

A primary advantage of this physical construction resides in the fact that the size of all components associated with the disc brake system do not exceed the diameter of the brake disc, so that such can be mounted within conventional wheel rims. Further, the sleeve or bushing carrying the brake shoes can possess an internal diameter which is maintained at such a size that the sleeve can be pushed onto standard axles, whereupon the contemplated objective of subsequently equipping a vehicle with such type brake system is completely fulfilled.

According to a further aspect of the invention, the jacket or outer surface of the bell-shaped housing is equipped at its marginal edge with substantially arc-shaped openings or recesses, whereby the columns or strut portions formed by the housing material remaining between these openings at the housing marginal edge serve for the convenient attachment of the brake disc. In this manner, there is obtained the desired rigid connection between the brake disc and its support and changes in the size or dimensions of the brake disc towards the outside during heating as well as also towards the inside during cooling do not cause any enlargement or widening due to alternate heating of the brake disc, and therefore, insure for long periods of use.

According to a further embodiment of the invention, it is contemplated that the brake shoe support is mounted nonrotatably upon the wheel axle through the use of a key-keyway guide arrangement or equivalent structure. By virtue of this arrangement, it is possible to construct the parts of the movable brake shoe support which are subject to wear so as to possess a large surface area, again resulting in increased longevity of the disc brake system.

Furthermore, the invention proposes the utilization of a special guide sleeve between the brake shoe support and the wheel axle. This is of particular advantage when motor vehicles are subsequently equipped with the new and improved disc brake system of the invention, since only the internal diameter of this intermediately arranged guide sleeve need be accommodated to the diameter of the wheel axle, whereas all of the remaining components of the disc brake system can be standardized to certain normal or standard sizes.

The invention also encompasses still further important features and details which will be considered hereinafter and which especially simplify the replacement or exchange of the brake shoes, whereby there occur only small periods of interruption or downtime in operation during exchange of the brake shoe linings or the brake discs. This, again, advantageously retains the costs of maintaining and servicing the system at a minimum. One further advantageous feature of the invention is attributable to the fact that the actuation components for the brake shoes can be accommodated in a closed housing, whereby contamination thereof, as well as escape of lubricant can be suppressed and only minimum maintenance of these components is necessary.

BRIEF DESCRIPTION OF THE DRAWING

The invention will be better understood, and objects other than those set forth above, will become apparent, when consideration is given to the following detailed description thereof. Such description makes reference to the annexed drawing wherein.

DESCRIPTION OF THE PREFERRED EMBODIMENT

Figure 1:
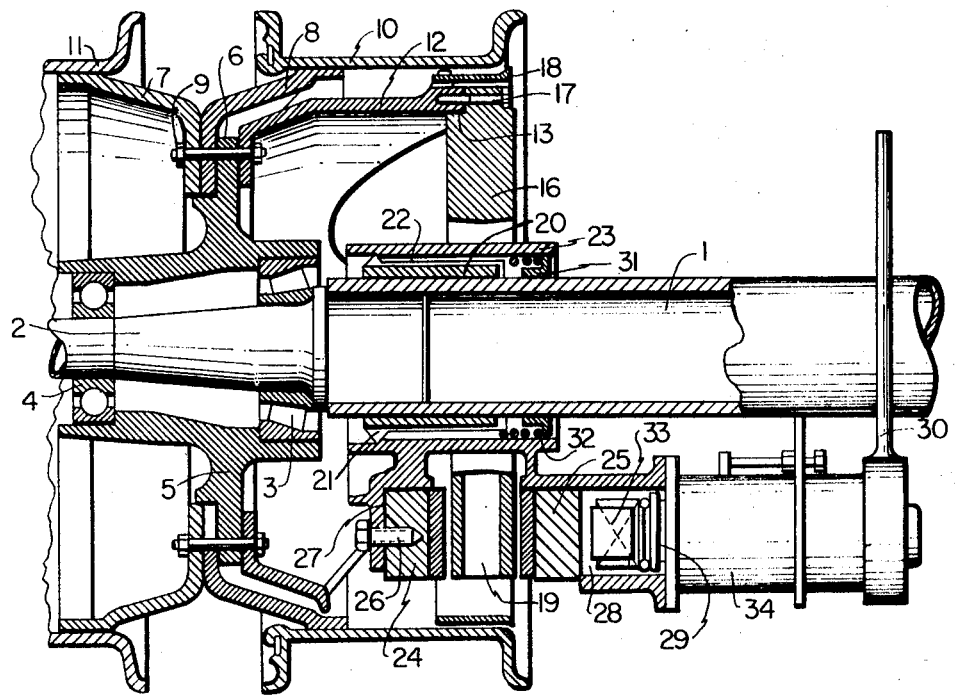
FIG. 1 is a sectional view through a portion of an axle of a motor vehicle equipped with the inventive disc brake system.
Figure 2:
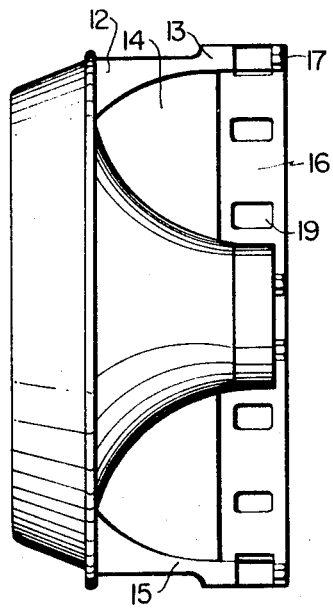
FIG. 2 shows details of the brake disc as used together with its support in the arrangement of FIG. 1.

Describing now the drawing, in FIG. 1 there is depicted a hollow wheel axle 1 of a motor vehicle or trailer, in which there is inserted a wheel shaft or trunnion 2 secured to axle 1 by any suitable conventional means not shown. The wheel shaft or trunnion 2 supports a wheel hub 5 through the agency of bearing means 3 and 4, and at the flange 6 of such wheel hub 5 there are secured, by means of threaded bolts 9 or equivalent structure, the wheel discs 7 and 8. Wheel discs 7 and 8 are connected with standard wheel rims 10 and 11, as indicated.

The threaded bolts or fastening devices 9 support a substantially bell-shaped housing 12 which extends further towards the axle 1. The outer skirt or marginal edge portion 13 of bell-shaped housing 12 is disposed within the wheel rim 10. Suitable openings or cutaway portions 14 are provided at the housing 12 and the remaining intermediate columns or struts 15 conveniently serve for the attachment of a brake disc 16 fixedly connected via threaded bolt means 17 with the bell-shaped marginal edge portion 13 of such housing 12. Intermediate the marginal edge 13 and the wheel rim 10 there is further arranged a sheet metal ring 18, which, in turn, is secured to the bell-shaped housing body 12. Ring member 18 insulates the brake disc 16 from radiant heat and also from contamination by dust and other foreign materials. The brake disc 16 is equipped with conventional holes 19 for venting purposes.

Continuing, it will be seen that a guide sleeve 20 is pushed onto the tubular axle 1 and welded to such. The outer surface of this guide sleeve 20 is provided with teeth flanks 21 which mesh or fit with similar type teeth flanks 22 provided at the internal bore of a sliding sleeve 23 serving as brake shoe support. The teeth flanks 21, 22 may be considered to provide a key-keyway guide arrangement which secures the brake shoe support 23 against rotation upon the wheel axle 1.

In the illustrated exemplary embodiment, there are provided two brake shoes 24 and 25, the brake shoe 24 being detachably yet firmly connected by a number of screws 26 with a flange 27 of the sliding sleeve 23. The other brake shoe 25 is suitably mounted to be axially displaceable and secured against rotation at the sliding sleeve 23. In order to axially displace such during the vehicle braking operation there can be utilized any suitable mechanical means or a hydraulic cylinder, for instance, and in the illustrated embodiment such is axially displaced by a cam pair means 28 moved by a camshaft 29; there could also be used a coarse threaded shaft. In order to rotate the shaft 29 there is provided an operating lever member 30 leading to the brake rod of the vehicle. A ring member 31 corresponding to the diameter of the guide sleeve 20 is secured upon the wheel axle 1. Ring member 31 serves as a bearing surface or support for a pressure spring 32, the force of which acts upon the displaceable slide sleeve 23, in that it attempts to displace such into a brake release position. Cam surfaces 33 are mounted upon the brake camshaft 29, so that upon displacing the lever member 30, these surfaces 33 press the brake shoe 25 against the brake disc 16 and when it is in contact therewith, the resulting pressure is transmitted to the entire sliding sleeve 23 against the pressure of the spring 32, so that also the brake shoe 24 comes to bear at the other side of the brake disc 16. Upon release of the brake, the spring member 32 displaces the sleeve 23 and nonillustrated springs return the brake shoe 25 back into the release position.

The entire brake shoe displacement device is advantageously mounted in a dust-free housing 34. The displacement device is equipped with standard readjustment mechanisms.

It should be apparent from the foregoing detailed description that the objects set forth at the outset of this specification have now been successfully achieved.

What is claimed is:

1. A disc brake system for a wheel having a wheel rim and a wheel axle, especially for motor vehicles, comprising cooperating brake disc means and a pair of movable brake shoe means, housing means, means for fixedly connecting said housing means with the wheel rim of the wheel to be braked, said housing means having an outer surface including a marginal edge portion for the attachment of said brake disc means for revolving movement between said pair of brake shoe means, means for detachably securing said brake disc means at its peripheral region with said marginal edge portion of said housing means, a substantially cylindrical guide sleeve fixedly carried directly by said wheel axle, a one-piece slideable support means surrounding said guide sleeve in spaced sliding relationship with respect thereto for mounting said pair of brake shoe means for axial displacement relative to said guide sleeve, means for securing said slideable support means for the pair of brake shoe means so as to be nonrotatable relative to said guide sleeve, said guide sleeve, said one-piece slideable support means and said brake disc means all being mounted within said wheel rim.

2. A disc brake system for a wheel having a wheel hub and a wheel axle, especially for motor vehicles, comprising cooperating brake disc means and a pair of brake shoe means, housing means connected with the wheel hub of the wheel to be braked, said housing means having an outer surface including a marginal edge portion provided thereat with spaced recesses defining therebetween column means for the attachment of said brake disc means for revolving movement between said pair of brake shoe means, means for detachably securing said brake disc means at its peripheral region with said column means of said housing means, support means for mounting said pair of brake shoe means for axial displacement relative to the wheel axle, said support means enclosing said wheel axle and a substantially cylindrical guide sleeve and defining a one-piece sliding sleeve member, a guide sleeve provided for said wheel axle within said one-piece sliding sleeve member, a key-keyway guide arrangement for nonrotatably securing said support means for said pair of brake shoe means at said guide sleeve.

3. A disc brake system as defined in claim 2, wherein said column means are resilient members.

4. A disc brake system as defined in claim 2, wherein said guide sleeve comprises a separate component having an internal bore accommodated to the external diameter of the wheel axle.

5. A disc brake system as defined in claim 4, further including means for detachably securing one of said brake shoe means to said brake shoe-support means.

6. A disc brake system as defined in claim 5, wherein the other of said brake shoe means is mounted to be axially displaceable at said brake shoe-support means.

7. A disc brake system as defined in claim 6, further including means for displacing said one axially displaceable brake shoe means, and a dust-free housing in which said displacing means is mounted.